United States Patent
Denkmann et al.

(10) Patent No.: US 10,287,690 B2
(45) Date of Patent: May 14, 2019

(54) SORBENT-COATED ALUMINIUM STRIP

(75) Inventors: Volker Denkmann, Kempen (DE);
Ulrich Hampel, Grevenbroich (DE);
Willi Schenkel, Grevenbroich (DE);
Andreas Siemen, Jüchen (DE); Wolf Oetting, Campbell, CA (US)

(73) Assignee: Hydro Aluminium Deutschland GmbH, Bonn (DE)

( * ) Notice: Subject to any disclaimer, the term of this patent is extended or adjusted under 35 U.S.C. 154(b) by 914 days.

(21) Appl. No.: 13/254,483

(22) PCT Filed: Feb. 25, 2010

(86) PCT No.: PCT/EP2010/052405
§ 371 (c)(1),
(2), (4) Date: Dec. 20, 2011

(87) PCT Pub. No.: WO2010/100071
PCT Pub. Date: Sep. 10, 2010

(65) Prior Publication Data
US 2012/0100987 A1 Apr. 26, 2012
US 2012/0264601 A9 Oct. 18, 2012

(30) Foreign Application Priority Data

Mar. 3, 2009 (DE) .......... 10 2009 003 560

(51) Int. Cl.
*C23C 22/83* (2006.01)
*C09D 7/61* (2018.01)
(Continued)

(52) U.S. Cl.
CPC ............... *C23C 22/83* (2013.01); *B05D 7/14* (2013.01); *C09D 5/14* (2013.01); *C09D 7/61* (2018.01);
(Continued)

(58) Field of Classification Search
CPC .. C23C 22/83; C09D 7/61; C09D 5/14; B05D 7/14; B05D 2601/20; B05D 2252/02;
(Continued)

(56) References Cited

U.S. PATENT DOCUMENTS 3,889,745 A * 6/1975 Siemonsen .................... 165/151
4,107,256 A * 8/1978 Conrad et al. ................ 264/310
(Continued)

FOREIGN PATENT DOCUMENTS

CN        1323977 A    11/2001
CN        1395606 A     2/2003
(Continued)

*Primary Examiner* — Kevin R Kruer
(74) *Attorney, Agent, or Firm* — Reinhart Boerner Van Deuren P.C.

(57) ABSTRACT

The invention relates to a method for producing an aluminum strip, in which the aluminum strip is coated with a sorption layer which has a binder and a sorbent. The object to propose a method for producing an aluminum strip coated with a sorption layer, by means of which an aluminum strip can be coated cost-effectively having constant performance characteristics with respect to the sorption of, for example, water vapor, is achieved according to the invention by means of a method for producing an aluminum strip coated with a sorption layer by applying a suspension to the aluminum strip in the coil-coating process, which in addition to a liquid comprises at least one binder, formed as a solid, and a sorbent, and by subjecting the aluminum strip, together with the applied suspension, to a drying process, in which the binder is activated.

13 Claims, 2 Drawing Sheets

(51) Int. Cl.
  *B05D 7/14* (2006.01)
  *C09D 5/14* (2006.01)
  *B05D 3/02* (2006.01)
  *C08K 3/36* (2006.01)
  *C08K 7/26* (2006.01)
  *C08K 3/34* (2006.01)

(52) U.S. Cl.
  CPC ........ *B05D 3/0254* (2013.01); *B05D 2202/25* (2013.01); *B05D 2252/02* (2013.01); *B05D 2601/20* (2013.01); *C08K 3/34* (2013.01); *C08K 3/36* (2013.01); *C08K 7/26* (2013.01)

(58) Field of Classification Search
  CPC .... B05D 3/0254; B05D 2202/25; C08K 3/36; C08K 7/26; C08K 3/34
  See application file for complete search history.

(56) References Cited

U.S. PATENT DOCUMENTS

| | | | | |
|---|---|---|---|---|
| 4,419,115 A * | 12/1983 | Johnson et al. | ................ | 65/395 |
| 4,466,832 A * | 8/1984 | Yoshimura et al. | .......... | 106/626 |
| 4,786,301 A * | 11/1988 | Rhodes | ............................ | 62/271 |
| 5,116,532 A * | 5/1992 | Chau et al. | ............ | 252/301.4 P |
| 5,280,054 A | 1/1994 | Sakai et al. | | |
| 5,498,678 A * | 3/1996 | Steffier | ......................... | 526/200 |
| 5,660,048 A * | 8/1997 | Belding et al. | ................... | 62/94 |
| 5,731,260 A * | 3/1998 | Abell | ............................ | 502/416 |
| 6,123,988 A * | 9/2000 | Ramanathan et al. | ..... | 427/213.3 |
| 6,337,129 B1* | 1/2002 | Watanabe et al. | ........... | 428/328 |
| 6,350,532 B1* | 2/2002 | Davisson et al. | ............. | 428/606 |
| 6,500,490 B1 | 12/2002 | Yan | | |
| 2001/0043993 A1* | 11/2001 | Ogawa | ......................... | 427/420 |
| 2003/0065085 A1* | 4/2003 | Nakada et al. | ............... | 524/538 |
| 2004/0231828 A1* | 11/2004 | Dunne et al. | ............. | 165/104.12 |
| 2007/0207335 A1* | 9/2007 | Karandikar et al. | ......... | 428/560 |

FOREIGN PATENT DOCUMENTS

| | | |
|---|---|---|
| DE | 44 05 669 A1 | 8/1995 |
| DE | 198 00 395 A1 | 7/1999 |
| DE | 10 2005 003 543 A1 | 8/2006 |
| EP | 1 153 990 A2 | 11/2001 |
| EP | 1 254 941 A1 | 11/2002 |
| JP | S5419548 A | 2/1979 |
| JP | H08200876 A | 8/1996 |
| JP | H10286460 A | 10/1998 |
| JP | 10-298776 A | 11/1998 |
| JP | H11304383 A | 11/1999 |
| JP | 2000502281 A | 2/2000 |
| JP | 2001-247822 A | 9/2001 |
| KR | 1020020070341 A | 9/2002 |

* cited by examiner

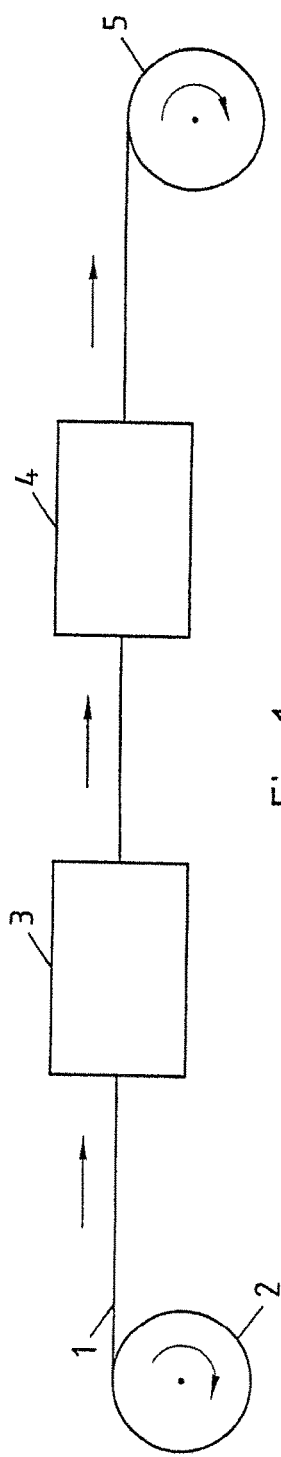
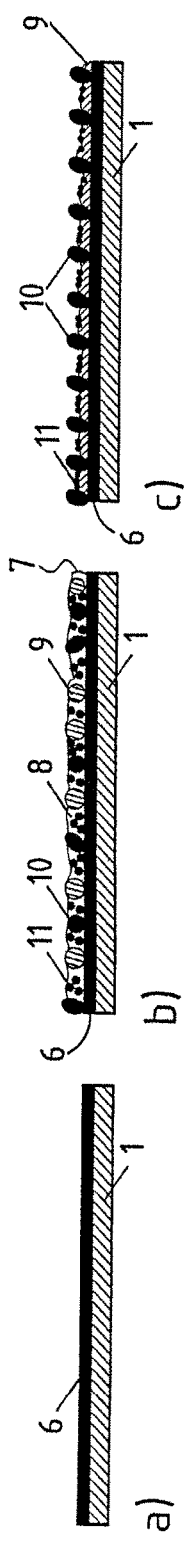
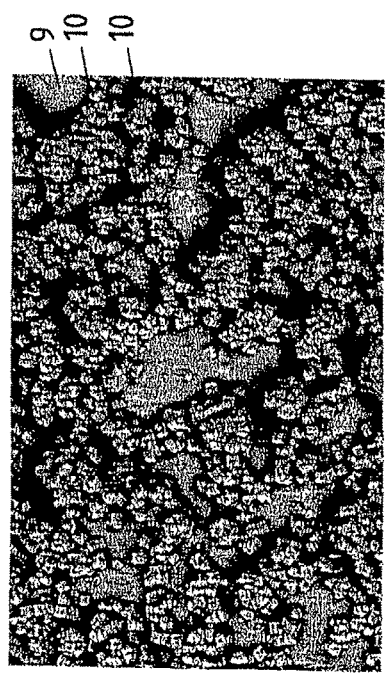

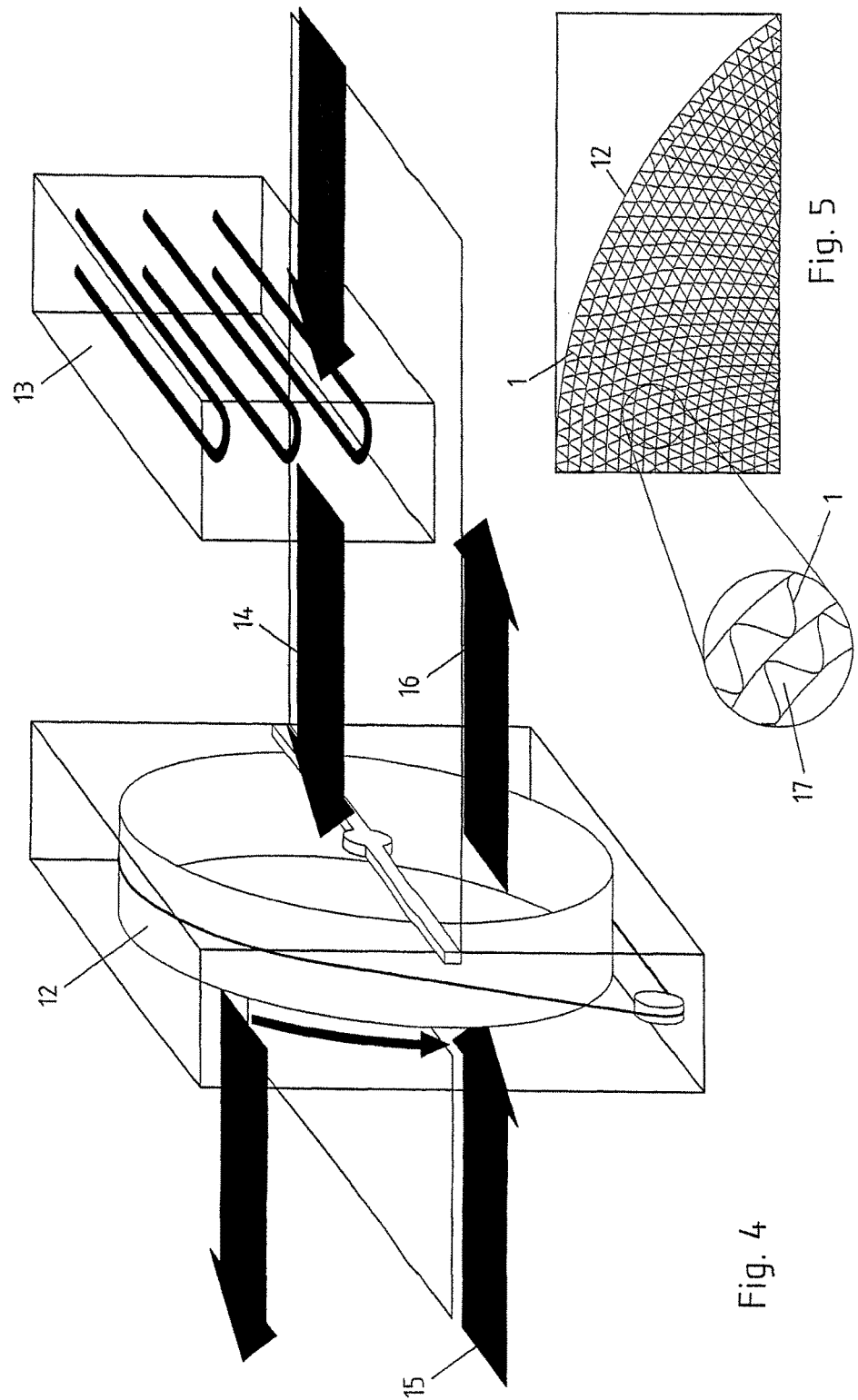

SORBENT-COATED ALUMINIUM STRIP

FIELD OF THE INVENTION

The invention relates to a method for producing an aluminium strip, in which the aluminium strip is coated with a sorption layer which has a binder and a sorbent. In addition, the invention relates to a correspondingly coated aluminium strip and to its advantageous use.

BACKGROUND OF THE INVENTION

Sorption rotors are used, for example, for dehumidifying air and have a number of thin channels, similar to a honeycomb structure, which are coated with sorbents. In this way, a surface coated with sorbents which is as large as possible can be provided. The sorbent now takes up water vapour, for example, by adsorption or absorption from the air flowing through the air channels. This continues until the sorbent is saturated and has to be regenerated. The regeneration is carried out using a rotating dehumidifier by the air channels, at least in one area, being flowed through with heated, dry air. The rotating dehumidifier rotates slowly for this purpose. The air channels then uninterruptedly pass through usually three sectors, in which in the first sector, for example, the air to be dehumidified, for example the supply air to a building, flows through the air channels and is dehumidified. In the second sector, the sorbent is regenerated by blowing in dry air with a temperature of 20 to 120° C., i.e. the moisture is extracted from the sorbent again. In the third and optional sector, the air channels are cleansed, so that they can be used again properly. However, a simpler design with just two sectors, one for dehumidifying the air and one for regenerating the sorbent, is also possible. Corresponding rotating dehumidifiers and their sorption rotors often have air channels which are provided in the form of folded paper. As the durability of these sorption rotors is low, producers are switching over to aluminium strips to produce the sorption rotors. For this purpose, the aluminium strip is coated, cut and formed so that it is undulated, with the result that channels can be provided by means of the undulating form. The aluminium strip was until now coated in the dipping process with a subsequent dispersing process to apply the sorption layer. This process is, however, really elaborate and expensive. Attempts have also been made to coat the aluminium strip in the coil-coating process, i.e. by using applicator rolls. In this cost-effective process for coating, however, problems arose with the adhesion of the sorption layer on the aluminium and also highly erratic performance characteristics in the finished, coated aluminium strip with respect to the sorption capacity, for example of water vapour. The binder wetting the sorbent particularly proved to be a problem.

SUMMARY OF THE INVENTION

Taking this as the starting point, the present invention is based on the object of proposing a method for producing an aluminium strip coated with a sorption layer, by means of which an aluminium strip can be coated cost-effectively having constant performance characteristics with respect to the sorption of, for example, water vapour. In addition, the invention is based on the object of proposing an aluminium strip coated according to the invention and its advantageous use.

The object disclosed above is achieved according to the invention by means of a method for producing an aluminium strip coated with a sorption layer by applying a suspension to the aluminium strip in the coil-coating process, which, in addition to a liquid, comprises at least one binder, formed as a solid, and a sorbent, and by subjecting the aluminium strip together with the applied suspension to a drying process, in which the binder is activated.

Using a suspension, which consists of a liquid, usually water, at least one binder, formed as a solid, and a sorbent, means that during the coil-coating process the suspension can behave like a liquid and the aluminium strip can be coated very evenly with the suspension, without the sorbent being wetted through the binder or the pores of the sorbent being closed by the binder. The suspension which is now evenly distributed on the aluminium strip contains the binder, which is still not activated, and the sorbent which is also very evenly distributed over the aluminium strip. The aluminium strip then passes through a drying process, in which the binder is activated and the liquid in the suspension evaporated.

Only activating the binder during the drying process, means that extremely thin layers of the binder can be applied to the aluminium strip and the sorbent is only minimally wetted through the binder, without the adhesive properties of the binder being impaired. Preferably, the binder formed as a solid can, for example, be a polymer. As a result, the aluminium strip produced in this way has particularly homogenous performance characteristics with respect to the sorption properties and, at the same time, can be produced in a very economical form.

Preferably, the drying process takes place at temperatures of 60° C. to 380° C. These temperatures are usually sufficient to activate the binder formed as a solid. By activating the binder it is understood, according to the invention, that the binder is converted into a state in which it produces a bonding between the sorbent and the aluminium strip. This is achieved with polymeric binders, for example, by liquefying the solid particles and curing these liquefied solid particles during drying and/or during cooling after the drying.

According to a further advantageous embodiment of the method according to the invention, zeolites or silica gels are used as sorbents, since these are cost-effective and have particularly good sorption properties, for example with respect to water vapour. In addition, it is also possible for lithium chloride to be used as a sorbent.

If the binder was produced by suspension polymerisation and/or suspension copolymerisation, the binder formed as a solid is present in the suspension in the form of spheres, i.e., in suspension polymerised form. The binder spheres can be broken up by heating during the drying process, so that the binder molecules held there can get caught up together and form a particularly thin binder layer which binds the particles of the sorbent, for example the silica gel particles or the zeolite particles, without wetting the surface thereof. In addition, by using the binder in the form of spheres, the binder can be particularly homogenously distributed, even if the solids content of the binder in the suspension is very low.

Particularly good properties with regard to adhesion to the aluminium strip and binding of the sorbent are obtained by the binder containing a mixture of acrylate copolymer and styrene copolymer, a mixture of polyvinyl acetate polymers and copolymers, polyvinyl acetals, polyvinyl alcohols, polyvinyl ethers, polyurethane and/or polymethacrylate homopolymers and copolymers. The binders referred to can all be produced in suspension polymerised form and in the activated form exhibit very good adhesive properties for the sorbent on the aluminium strip. The wetting of the sorbent is slight with these materials with a narrow binder layer thickness.

In order to specifically set the sorption properties of the aluminium strip, the solids content of the sorbents in the suspension is between 5% and 90%. Particularly high performance characteristics were obtained with solids contents of more than 70%. A higher content of more than 90% of sorbents involves the risk of the adhesive properties being impaired due to the content of binders being too low.

If polyvinyl alcohols, polyacrylates and/or polyvinyl butyrals are added as additives to the preferably aqueous suspension, the sorption effect of the sorption layer of the aluminium strip can be further optimised, since by adding the additives additional binding sites can be made available for the sorbent particles and hence the solids content of the sorbent can be further increased.

Preferably, silver nanoparticles are integrated into the coating system, so that the aluminium strip has an antibacterial effect with the sorption layer. To that end, the silver nanoparticles are applied to the aluminium strip in the suspension. It is also thereby possible to obtain other specific properties with the sorption layer by adding other functional constituents to the suspension.

According to a further exemplary embodiment, the surface of the aluminium strip is pre-treated, preferably chromated, before the coating process. This improves the adhesive properties of the binder and the corrosion properties of the aluminium strip.

For an aluminium strip, the above disclosed object is achieved by coating it on one side using a method according to the invention and by the aluminium strip having a thickness of 0.03 mm to 0.6 mm, preferably 0.06 mm to 0.2 mm. Corresponding aluminium strips can not only be particularly economically coated with a sorbent but can also be easily manufactured into sorption rotors. For this purpose, the aluminium strips must be correspondingly cut to size, formed so that they are undulated, and coiled.

According to a further exemplary embodiment of the aluminium strip according to the invention, it has been shown that particularly high performance characteristics can be obtained for the sorption by the thickness of the sorption coating being 2 to 30 g/m², preferably 5 to 8 g/m². These layer thicknesses resulted in optimum adhesive properties with maximum sorption characteristics.

If, according to a subsequent exemplary embodiment of the aluminium strip according to the invention, the aluminium strip consists of an EN AW 8006 or EN AW 8011 type aluminium alloy, the aluminium strips possess particularly good strength values, so that the particularly narrow thicknesses can be easily worked. For example, corresponding aluminium strips have a yield point of more than 180 MPa and a tensile strength of more than 250 MPa and therefore possess optimum working properties for producing sorption rotors. Optionally, a previously pre-treated, preferably chromated, aluminium strip can be coated with sorbents, so that the adhesive and corrosion properties are improved.

Finally, using an aluminium strip coated according to the invention for producing heat exchangers, circulating heat exchangers, in particular sorption rotors and active dehumidifying devices, is particularly advantageous, since here particularly large surfaces coated with sorbents are required, which can be economically provided by the method according to the invention and the coated aluminium strips produced using this method. Particularly thin aluminium strips having a thickness of 0.03 mm to 0.6 mm enable particularly compact sorption rotors and dehumidifying devices to be constructed.

BRIEF DESCRIPTION OF THE DRAWINGS

There are now many possibilities for developing and refining the method according to the invention for producing aluminium strips coated with sorbents, the aluminium strip according to the invention and its use. Reference is made, in this regard, to the claims subordinate to claim 1, on the one hand, and to the description of exemplary embodiments in conjunction with the drawing. In the drawing:

FIG. 1) shows a schematic view of a first exemplary embodiment of the method according to the invention for coating an aluminium strip with a sorption layer, FIGS. 2)a-c) show in a schematic sectional view an aluminium strip produced according to the invention at three different points in time during execution of the method according to the invention, FIG. 3) shows a microscopic image of a surface of an aluminium strip coated according to the invention, FIG. 4) shows in a schematic, perspective illustration an exemplary embodiment of a use according to the invention of the coated aluminium strip in a sorption rotor and FIG. 5) shows a partial view of a sorption rotor having an aluminium strip coated according to the invention.

DETAILED DESCRIPTION OF THE INVENTION

In FIG. 1, firstly the method according to the invention for coating an aluminium strip 1 with a sorption layer is schematically illustrated. The aluminium strip 1 is uncoiled from a decoiler 2 and conveyed to a coil-coating device 3 which comprises applicator rolls which are not illustrated. After the aluminium strip 1 has been coated on one or both sides in the coil-coating device 3, it is conveyed to a continuous furnace 4 which subjects the aluminium strip 1 with the applied suspension, consisting of sorbent and binder, to a drying process. The temperatures during the drying process are at most 60° C. to 300° C. on the metal surface, i.e. the PMT (peak metal temperature) is between 60° C. and 300° C. Then, the aluminium strip 1, preferably in the cooled state, is coiled on a coiler 5. Of course, it is also possible, after the drying process, to convey the aluminium strip directly to further production processes, for example a process for producing blanks, a process for separating the strip into widths to be used, for example, for sorption rotors and/or a process for forming the aluminium strip so that it is undulated.

According to the invention, the binder formed as a solid is only activated during the drying process and can be distributed over the suspension in correspondingly narrow layer thicknesses on the aluminium strip 1. Particularly narrow binder layer thicknesses are hereby possible which result in minimal wetting of the sorbent surface by the binder. In this respect, a maximum sorbent surface is made available on the aluminium strip.

This becomes clear in FIGS. 2a-c. The aluminium strip 1 in the exemplary embodiment illustrated in FIG. 2, has, for example, a chromate coating 6 which improves the adhesive properties and the corrosion properties of the aluminium strip 1. By means of a coil-coating process 3 using applicator rolls, a suspension 7, comprising a liquid 8, preferably water, a binder 9, formed as a solid, and the sorbent 10, is now applied to the strip. In the exemplary embodiment illustrated in FIG. 2b, silver nanoparticles 11 are also additionally contained in the suspension, which create an anti-bacterial effect on the aluminium strip surface after the drying process. As FIG. 2b shows, the binder 9 in the suspension 7 is initially not activated and is preferably present as a solid in the form of spheres, finely distributed on the aluminium strip. The form in the shape of spheres is obtained, for example, by suspension polymerisation and/or suspension copolymerisation of a mixture of acrylate and styrene polymers.

FIG. 2c now shows the aluminium strip 1 in a sectional view after the drying process. During the drying process, not only is the water 8 in the suspension 7 evaporated but also the binder 9 is activated by the spherical binder particles bursting open during the drying process and leaving behind an extremely thin binder layer 9 on the aluminium strip 1. The silver nanoparticles 11 are distributed in the binder layer 9 and partly lie on the surface between the sorbent particles 10 and bring about an anti-bacterial effect.

FIG. 3 shows a microscopic surface image of an aluminium strip coated according to the invention. In the exemplary embodiment in FIG. 3, a mixture of acrylate copolymer and styrene copolymer was used as the binder and silica gel as the sorbent. It can be clearly identified that the binder 9 only wets the sorbent 10 a little, so that the sorption capacity of the sorbent 10 is only very slightly impaired. As a result, aluminium strips with a very high sorption capacity can be provided.

These are, for example, employed in sorption rotors 12, the workings of which are illustrated in the perspective view in FIG. 4. A sorption rotor 12 usually consists of a flat cylinder which has air channels distributed in concentric passages. The air channels, in the exemplary embodiment illustrated in FIG. 4, are produced from a correspondingly coiled, undulated aluminium strip 1. Preferably, the aluminium strips are about 0.07 mm thick and correspondingly undulated.

The slowly rotating sorption rotor 12 is exposed to air 14, heated via a heating device 13, in at least one sector, so that the sorption layer present on the aluminium strip 1 is regenerated in the areas flowed through with hot air, i.e., so that the moisture contained in the sorbent is extracted as a result of the heated air which usually has a temperature of 20 to 120° C. The air channels regenerated in such a way are then rotated by the slow rotation of the sorption rotor into the second sector in which they are, for example, flowed through by moist outside air 15. The sorbent 10 takes up the moisture contained in the outside air 15, so that the inflowing air 16 is dried. Sorption rotors 12, which comprise the aluminium strip according to the invention, exhibit high performance characteristics with respect to the uptake of moisture from the air, if, for example, silica gels or zeolites are used as sorbents. The required aluminium strips can also be produced economically by means of the method according to the invention.

Finally, FIG. 5 shows the structure of a sorption rotor 12 and the undulated course of an aluminium strip 1 coated according to the invention in the sorption rotor. The aluminium strip 1, which is formed so that it is undulated, is arranged between concentrically arranged, circular aluminium passages, so that air channels 17 are formed. Preferably, the aluminium strips 1 used in the sorption rotor 12 are coated on both sides, in order to maximise the sorption capacity of the sorption rotor.

The invention claimed is:

1. Method for producing an aluminium strip, comprising: coating the aluminium strip with a sorption layer which comprises a suspension;
applying the suspension to the aluminium strip in the coating process, the suspension comprising a liquid, at least one binder, formed by suspension polymerisation or by suspension copolymerisation, and a sorbent, wherein the sorbent in the suspension is not wetted through the solid binder, and
subjecting the aluminium strip together with the applied suspension to a drying process, in which the liquid in the suspension is evaporated and the binder is activated, wherein zeolites or silica gels are used as sorbents.

2. Method according to claim 1, wherein the drying process takes place at temperatures of 60° C. to 380° C.

3. Method according to claim 1, wherein the binder comprises a mixture of acrylate copolymer and styrene copolymer, a mixture of polyvinyl acetate polymers and copolymers, polyvinyl acetals, polyvinyl alcohols, polyvinyl ethers, polyurethane and/or polymethacrylate homopolymers and copolymers.

4. Method according to claim 1, wherein the suspension comprises polyvinyl alcohols, polyacrylates and/or polyvinyl butyrals as additives.

5. Method according to claim 1, wherein silver nanoparticles are integrated into the coating system.

6. Method according to claim 1, wherein the surface of the aluminium strip is pre-treated before the coating process.

7. Method according to claim 6, wherein the aluminium strip is chromated during the step of pre-treatment before the coating process.

8. Aluminium strip coated with a one-sided or double-sided sorption layer using a method according to claim 1, wherein the aluminium strip has a thickness of 0.06 mm to 0.2 mm.

9. Aluminium strip coated with a one-sided or double-sided sorption layer using a method according to claim 1, wherein the aluminium strip has a thickness of 0.03 mm to 0.6 mm.

10. Aluminium strip according to claim 9, wherein the thickness of the sorption layer is 2 to 30 g/m$^2$.

11. Aluminium strip according to claim 9, wherein the aluminium strip consists of an EN AW 8006 or EN AW 8011 type aluminium alloy.

12. Aluminium strip according to claim 9, wherein the thickness of the sorption layer is 5 to 8 g/m$^2$.

13. An apparatus comprising one element selected from the group consisting of a heat exchanger, a circulating heat exchanger, a sorption rotor and an active dehumidifying device, the element comprising an aluminium strip according to claim 9.

* * * * *